Patented June 27, 1944

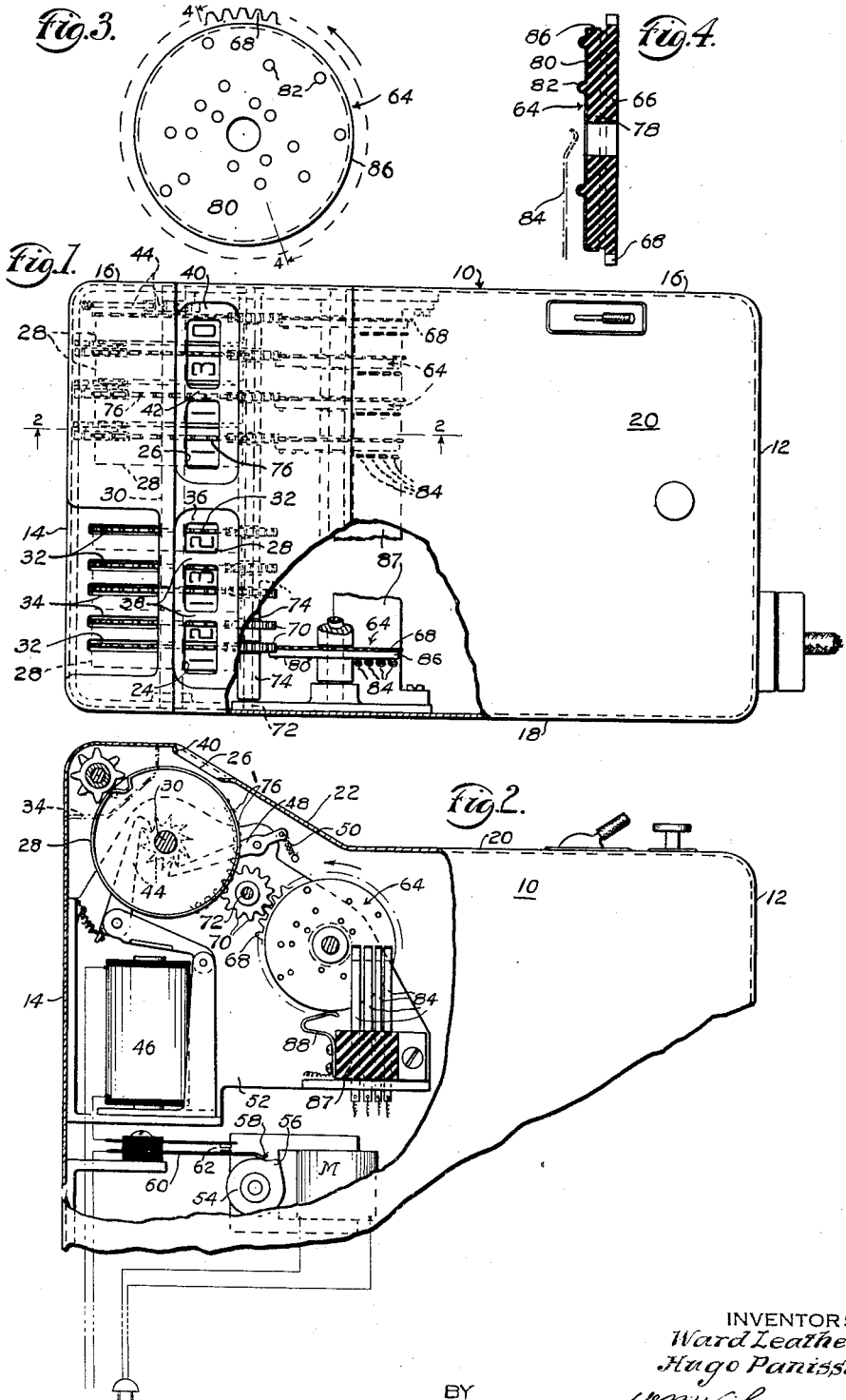

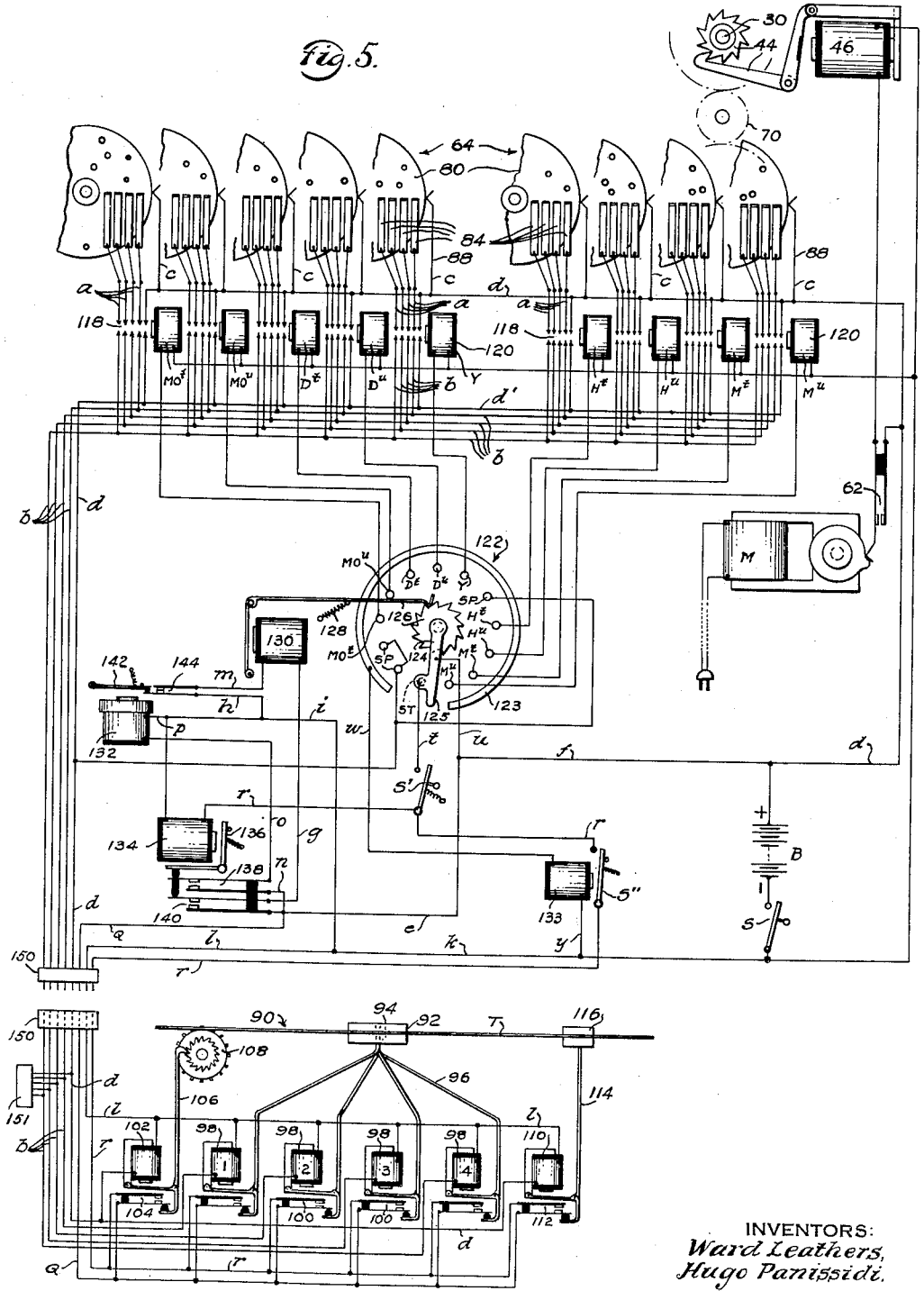

2,352,440

UNITED STATES PATENT OFFICE 2,352,440

TIME RECORDING MECHANISM

Ward Leathers, Brooklyn, and Hugo Panissidi, Jamaica, N. Y., assignors to International Business Machines Corporation, New York, N. Y., a corporation of New York Application January 27, 1943, Serial No. 473,724

5 Claims. (Cl. 234—1.5)

The improved time recording mechanism comprising the present invention is primarily adapted for use as an auxiliary or counterpart apparatus adapted to be electrically connected in any suitable manner, as for example, by a simple plugging-in operation, to a perforating apparatus or other main recording mechanism for modification of the operation of such mechanism in order to cause the latter to perforate or otherwise record at selected intervals a time function, as for example, a record of the year, month, day, hour and minute without otherwise modifying the function of the main recording mechanism.

The apparatus is thus adapted for use in various fields, as for example, in public utility accounting where a record is made by the utility company for services rendered in the distribution of a commodity, such as electricity, gas, water or two or more of these commodities jointly, or in the rendering of telephone service where charges for calls are based, at least in part, on the time of day when the call is made and on the length of time that the call is in duration. In such instances where a commodity is distributed, and a perforated record is made of such distribution, various data such as the character of the service rendered, i. e. commercial or residential, the consumption figure or figures, fuel adjustment, if any, tax, and the various charge data in dollars and cents may be grouped together on the record media under the individual account numbers representing the various consumers. Likewise, where telephone service is rendered, identification of the customers' accounts must be made, together with the ncessary data relating to the various calls that are completed so that the proper charges may be computed. Where the accounting system involves the use of automatic perforating or recording mechanism, it may be desirable in the former instance to make a record of the time at which a particular account is processed. In the latter instance, it is not only desirable but essential that a time record be made so that the account may, on the basis of that record, be properly processed.

The present invention makes possible the application of a time notation to the original record media on which the usual record data is being printed or in which it is being perforated without disturbing the normal functioning of the particular recording apparatus employed. Thus the recorder may function in its usual manner to apply to the record media the necessary information for processing the account and, according to the present invention, at any desired instant, as for example, during the interim between the application of the record data to successive accounts in the case of commodity billing, or at the commencement and termination of conversation in the case of telephone billing, the same recorder that applies the billing data to the record media may be used to apply the time data as well.

The invention is susceptible to modification, however, and instead of being employed as an auxiliary apparatus for modifying or extending the operation of a main recording apparatus, the same may be independently employed and operated as a simple date printing or perforating machine which is capable at any desired moment to supply a printed or perforated record of the year, month, day, hour and minute.

The provision of an apparatus of the character set forth above being the principal object of the present invention, a further object is to provide a fully automatic electrical apparatus which when electrically coupled to a recording or perforating apparatus will, upon closing of a starting circuit momentarily, operate to automatically print or perforate the desired time data one character at a time in succession in such a manner that the various characters are properly spaced one from another.

Another object of the invention is to provide such an apparatus which will automatically cease printing or perforating when the desired data has been applied to the record media and will await further momentary circuit closing operations for its next functioning.

Another object is to provide a time recording mechanism which is designed for use as an auxiliary recorder and which will normally remain electrically disassociated from the main recording apparatus until such time as it is set into operation and at which time it will automatically become connected thereto for operative time recording operations.

Where a printed record media is to be employed for record purposes, obviously the time data will be applied to the record media in figures of the Arabic system. Where a perforated record media is to be employed, the time data will obviously be applied to the media in the form of code perforations. In the present instance, purely for purposes of illustration and convenience, the record media employed has been shown in the form of telegraphic tape which is perforated according to a special telegraphic code commonly known as the "Telelector" code.

A novel feature of the invention is the use of a coding unit which is in the form of a rotary circuit maker and breaker in combination with a rotary time recording member, the movements of which are controlled by a conventional Telechron motor. According to the present invention, the movements of the rotary coding unit are interpreted at the perforating mechanism and the record media perforated accordingly. The rotary coding unit operates to translate its rotary motion which is expressive of the various Arabic numerals representing time elements into telegraphic code, the coding operation taking place solely by virtue of the rotary coding unit and its association with a series of electrical circuits, opening and closing of which controls the operation of the perforating device.

Other objects and advantages of the invention not at this time enumerated will become apparent as the nature of the invention is better understood.

In the accompanying two sheets of drawings forming part of this specification, one preferred embodiment of the invention is shown. In these drawings:

Fig. 1 is a top plan view of an assembled apparatus constructed in accordance with the principles of the present invention. In this view certain parts have been broken away to more clearly reveal the nature of the invention.

Fig. 2 is a fragmentary sectional view taken substantially along the line 2—2 of Fig. 1.

Fig. 3 is a plan view of a rotary coding unit employed in connection with the present invention.

Fig. 4 is a sectional view taken substantially along the line 4—4 of Fig. 3.

Fig. 5 is a diagrammatic view illustrating the electrical circuits employed in connection with the present invention.

In all of the above described views like characters of reference are employed to designate like parts throughout.

*Brief description*

Referring now to the drawings in detail, briefly the improved time recording device involves in its general organization a combined time indicator and control device having a plurality of rotary cylindrical indicating wheels arranged in two groups, the wheels of one group being manually settable to indicate the month and day of the year and the wheels of the other group being synchronously driven by a Telechron or similar motor and serving to indicate the hour and minute of the day.

The indicating wheels are operatively geared to circuit making and breaking devices, which function as coding devices, and the latter are electrically connected through a selecting mechanism, by means of which impulses are sent from each circuit making and breaking device to an electrically operated recording device which may be a printing or perforating apparatus and which, in the present form of the invention, is illustrated as a perforator that operates upon a continuous strip of telegraphic tape to apply the time notations thereto in the form of the selected code. The selecting mechanism is automatically operable or self-timed and its operation depends upon the electrical functioning of the machine in such a manner that each operation thereof awaits the conclusion of the action of the perforator which operates to perforate the tape one character at a time. Such operation of the selector mechanism is to be distinguished from timer driven operation which is less stable and the functioning of which is more difficult to control.

*The time indicating control device*

Referring now to Figs. 1 and 2, the time indicating and control device involves in its general organization a casing 10 including a front wall 12, a rear wall 14, side walls 16 and 18, a bottom wall (not shown) and a top wall 20. The top wall is provided with an inclined portion 22 having a pair of glass sealed window openings 24 and 26 formed therein through which the various indicating elements are visible.

The indicating elements are in the form of rotary cylindrical members 28 mounted on a common transverse shaft 30 fixedly secured at the opposite side walls 16 and 18. The members 28 are arranged in two groups, one of which is disposed behind the window opening 24 and the other of which is disposed behind the window opening 26. The former group is representative of the year, month and day, while the latter group is representative of the hour and minute of the day. The former group is manually settable and, toward this end, each wheel has associated therewith a toothed adjustment disc 32 of a relatively large diameter and a small arcuate portion of which projects through a slot 34 formed in the top wall of the casing for manual manipulation.

A frame 36 surrounds the window opening 24 and is provided with dividing webs 38 between the second and third wheel in the first group of wheels and another web is disposed between the fourth and fifth wheel in this group, thus dividing the window opening 24 into three viewing apertures. The two wheels, the peripheries of which are visible through the first viewing aperture, are representative of the month of the year. The two wheels, the peripheries of which are visible in the next adjacent aperture, are representative of the day of the month, and the single wheel, the periphery of which is visible through the third aperture, is representative of the year.

A frame 40, similar to the frame 36, surrounds the window opening 26 and is provided with a partition 42 dividing the same into two viewing apertures. The peripheries of two of the indicating wheels are visible behind each of the apertures, one pair of wheels being representative of the hour of the day and the other pair thereof being representative of the minute within the hour. The various indicating wheels 28 may have printed or otherwise marked on their peripheries a series of digits which are so arranged in sequential order as to produce the proper sequence of minutes and hours when driven continuously. Thus, the wheel which represents the units digits for indicating minutes will have marked thereon a series of digits ranging from 0 to 9 in regular order. The next adjacent wheel, however, which represents the tens digits of the minute indicating group will have a series of digits thereon ranging from 0 to 5 only inasmuch as no reading higher than 59 minutes will be encountered. The wheel representing the units digit for indicating the hour of the day will be accordingly marked with numerals ranging from 0 to 2, while the tens digit for the hour of the day will carry only two digits, namely, 0 and 1 arranged alternately around the periphery of the dial.

The four wheels arranged behind the window opening 26 are connected together by a conventional transfer arrangement and the first wheel in the series, i. e. the wheel which represents the units digit for representing the minute within the hour is adapted to be driven by means of a ratchet and pawl mechanism 44 (see Fig. 2), the operation of which is controlled by means of an electromagnet 46. A holding pawl 48, which is spring pressed as at 50, is pivoted on a framework 52 carried by the casing 10 and serves to prevent rotation of the wheel in the wrong direction. The ratchet and pawl mechanism 44 is of the direct stroke type and serves to index the particular wheel 28 with which it is associated upon momentary energization of the electromagnet 46.

The electromagnet 46 is adapted to be periodically energized at intervals one minute apart by virtue of a cam 54, the movements of which are controlled by a Telechron motor M. The cam 54 is provided with a raised portion 56 formed on the periphery thereof and upon which a cam finger 58 formed in one arm 60 of a pair of contacts 62 is adapted to ride in passing. One contact of the pair is electrically connected to one terminal of the magnet 46 and the other terminal of this magnet is electrically connected to the negative side of a power line leading from a battery B (see Fig. 5). The other contact of the pair of contacts 62 is connected to the positive side of the power line, as shown in both Figs. 2 and 5.

The coding devices

The various coding devices above referred to are designated in their entirety at 64 and one such coding device is shown in detail in Figs. 2 and 3. This coding apparatus comprises a rotary switch assembly designed to selectively close one or more of a series of signaling circuits in such a manner that rotary motion may be converted into recorded telegraphic code linearly arranged and expressive of the various time data appearing on the indicating wheels 28. The assembly 64 includes a rotary disc 66 having teeth 68 formed on the periphery thereof and meshing with similar teeth formed on an idler gear 70. The various idler gears of the system are mounted for rotation upon a common shaft 72 and are maintained in proper spaced relationship by means of a series of spacing collars 74. Each of the indicating wheels 28 in the group under consideration is secured to a toothed disc or gear 76 similar to the toothed discs 32 but of somewhat smaller diameter and these latter gears 76 are in constant mesh with respective idler gears 70 in order that periodic movement of the various indicating elements 28 may be transmitted to the rotary disc 66. Each of the discs 66 has secured thereto in face-to-face relationship a circular insulating plate 78 of slightly smaller diameter than the disc 66 and the outside face of the insulating plate 78 has secured thereto metallic contact plate 80 in which there are formed a series of protuberances 82 (see Fig. 4). The protuberances 82 are adapted to cooperate with a series of four contact brushes 84 upon rotation of the disc 66 in such a manner as to periodically close one or more of a series of signaling circuits leading to a perforating device 90. The protuberances 82 are so disposed on the surface of the contact plate 80 that upon engagement with the various brushes 84 the signaling circuits will be closed in such a manner as to potentially actuate the perforating device according to the selected code. The contact plate 80 is formed with a laterally extending peripheral flange 86 against which a common takeoff brush 88 continuously bears. The brush 88 is secured to an insulating block 87 and the block 87 is utilized for supporting the contact brushes 84, the entire assembly just described being suitably supported within the framework 52.

The perforating device

Referring now to Fig. 5, the perforating mechanism just mentioned is more or less conventional in its design and no claim is made herein to any novelty associated therewith. The perforator includes the usual die block assembly 92 through which the tape T, upon which the time recordings are to be made, passes. A series of punching dies 94 associated with the die block 92 cooperate with thrust rods 96 for effecting perforations in the tape. The rods 96 are actuated under the control of respective magnets 98, labeled 1, 2, 3 and 4, and are adapted upon energization of these magnets to engage their respective punches 94 and force the latter upwardly through the tape. Each of the magnets 98 has associated therewith a pair of normally open contacts 100 adapted upon energization of the magnets to become closed for purposes that will be set forth presently.

An additional magnet 102 having a pair of normally open contacts 104 associated therewith operates upon energization thereof to actuate a ratchet and pawl mechanism 106, which in turn operates to index a tape advancing wheel 108 one position. The ratchet and pawl mechanism 106 is of the return stroke type, i. e. this mechanism becomes preset upon energization of the magnet 102 and operates when released by the magnet to advance the wheel 108.

A magnet 110 having a pair of normally open contacts 112 associated therewith operates upon energization thereof to elevate a thrust rod 114, which in turn engages a die punch 116 to apply drive hole perforations to the tape T.

The selecting apparatus

The brushes of the coding devices 64 are electrically connected by means of signaling circuit wires $a$ to a common group of wires $b$ leading to the perforator 90, corresponding brushes in the various groups being electrically connected together in common. The common wire leading from each contact plate 80 is designated at $c$ and all of these common wires are connected together in common by a line $d$ leading from the positive side of the battery B and also leading to the perforator 90. The wires $c$ are also connected together in common by means of a line $d'$, which latter line is connected to the line $d$. Interposed in the various lines $a$ and $c$ are a plurality of electromagnetically controlled contact groups 118, each group operating under the control of an electromagnet 120. In addition to the designating numeral 120, the various electromagnets are individually labeled $Mo^t$, $Mo^u$ to indicate the tens and units digits of the figure which represents the month of the year; $D^t$ and $D^u$ to indicate the tens and units digits of the numeral representing the day of the month; Y to represent the units digit of the year; $H^t$ and $H^u$ to represent the tens and units digits of the figure indicating the hour of the day; and $M^t$ and $M^u$ to represent the tens and units digits of the figure representing the minute of the hour. The electromagnets 120 are designed for selective and successive operation by means of a selector switch 122 having thirteen contacts. The various contacts of the selector switch 122 are labeled to correspond to the various magnets 120 which are to be selected and certain of these contacts have been labeled SP to indicate a space on the tape T, the spaces, of course, being provided between the coded characters on the tape T and dividing the month, day and year indication from the hour and minute indication. Spaces are also provided between successive applications to the tape of the various time indications. One of the contacts of the switch 122 has been labeled ST to indicate a starting position for automatic operation of the selector switch.

The switch is provided with a rotary sweep or contact arm 124, the movements of which are controlled by means of a ratchet and pawl mechanism 126 which is spring biased as at 128 and which operates under the control of an electromagnet 130. Upon energization of the magnet 130, the ratchet mechanism 126 assumes a preset condition and upon deenergization of the magnet 130 the ratchet mechanism performs its effective indexing operation.

The switch 122 is provided with an arcuate contact strip 123 which extends around the circularly arranged group of contacts from a point adjacent the contact $M^u$ to a point adjacent the last of the contacts SP. The rotary sweep arm 124 of the switch 122 is provided with an extension 125 in the form of a brush adapted to ride upon the contact strip 123 and make electrical contact therewith in all positions of the arm except the starting position thereof when this arm is in engagement with the contact ST. The contact strip 123 is connected by means of a lead line w to the winding of a relay magnet 133 and this winding is also connected by means of a lead line y to the negative side of the battery B. The magnet 133 serves upon energization thereof to close a normally open switch S'' interposed in a line r, the function of which will be made clear presently.

Two additional electromagnets 132 and 134 form a part of the selecting mechanism. The magnet 132 is provided with a copper jacket which renders the magnet slow to respond to energization of its windings. The magnets 130 and 134, however, are immediately responsive to energization of their respective windings. The armature 136 of the magnet 134 has associated therewith two pairs of normally open contacts 138 and 140 operable upon energization of the magnet 134 to become closed. One contact of the pair 140 is connected to the positive side of the battery B through lead lines e and f, the other contact of the pair is connected by a lead line g to the electromagnet 130. The armature 142 of the electromagnet 132 has associated therewith a single pair of normally closed contacts 144 operable upon delayed energization of the magnets to become open. One contact of the pair of contacts 144 is connected by means of lead lines h, i and k to the negative side of the battery B through a circuit closing switch S. This latter contact of the pair 144 is also connected through lines h, i and l to the perforator, this latter line l constituting a common connection for the windings of the various perforator magnets. The other contact of the pair 144 is connected by means of a line m to the winding of the electromagnet 130. One contact of the pair of contacts 138 of the magnet 134 is connected by means of lines n, e and f to the positive side of the battery B, the other contact thereof is connected by means of a line o to the winding of the electromagnet 132. This winding is also connected through lines p, i and k to the negative side of the battery B through the switch S. The lines e and f are connected by means of a line q to the various contacts 104, 100 and 112 of the perforator 90. These latter contacts are also connected by means of the line r and switch S'', previously mentioned, to the winding of the electromagnet 134 and also through the line r and switch S'' to the normally open starting switch S', which is in turn connected to a line t to the starting contact ST of the switch 122. Lines u and f serve to connect the sweep arm 124 to the positive side of the battery B.

*The operation of the apparatus*

It will be seen that when the switch S is closed, electrical power becomes available for all of the various electrical instrumentalities which cooperate to make up the time perforating device. After the switch S has been closed and the operator momentarily depresses the spring biased switch S', the electromagnet 134 receives an impulse of current from the positive side of the battery B through the lines u, f and r, thereby immediately energizing this magnet and causing the contacts 138 and 140 to become closed. At the same time, the electromagnet 132 receives an impulse of current inasmuch as it is connected in series with the pair of contacts 138 and battery B. As previously described, however, this latter magnet is of the slow acting type and, as a consequence, the pair of contacts 144 remain closed a sufficient length of time to allow the electromagnet 130 to become energized through the lines f, e, pair of contacts 140 and line g, and line m, said contacts 144, the lines h, i, k, and battery B. Immediately upon energization of the magnet 130 the ratchet mechanism 126 assumes its retracted or preset position. When energization of the magnet 132 shortly afterwards takes effect, the pair of contacts 144 become open thus deenergizing the magnet 130 and allowing the ratchet mechanism 126 to index the sweep arm 124, this arm moving from the contacts labeled ST to the contacts labeled $M^u$. Immediately upon engagement of the arm 124 with the contacts $M^u$, current flowing from the positive side of the battery B to the arm 124 will pass through the arcuate contact strip 123 in line w to the winding of the electromagnet 133, thus energizing the latter and closing the normally open switch S''. As the sweep arm 124 comes to rest upon the contact $M^u$, the magnet $M^u$ becomes energized thus closing the group of contacts associated with this latter magnet and causing the perforator 90 to become actuated to perforate in the tape T the coded numeral according to the position assumed by the coding unit 64 which determines the unit digit. Simultaneously with the energization of the proper perforating magnets 98, the magnets 102 and 110 also become energized, thus applying drive hole perforations to the tape and presetting the ratchet mechanism 106 so that upon deenergization of the magnet 102 the tape will be advanced. Prior to deenergization of the various magnets 98, 102 and 110, the respective contacts 100 become closed, thus allowing an impulse of current to pass through the lines e and q, the contacts 100 and the line r and closed switch S'' to again energize the magnet 134, whereupon the cycle of events previously described is repeated and the sweep arm 124 moves from the contact $M^u$ of the switch 122 to the contact $M^t$. Parting of the sweep arm 124 with the contacts M$^u$ causes deenergiaztion of the magnet M$^u$ and opening of its group of contacts, thus deenergizing the perforating magnets 98 and the magnets 102 and 110.

The operation of the apparatus is continuous with the sweep arm 124 traveling across the various contacts of the switch 122 in succession. After the perforator 90 has operated upon the tape T to apply code perforations thereto indicating the minute of the hour and hour of the day, the sweep arm 124 comes to rest upon one of the contacts labeled SP whereupon the perforator 90 is actuated to advance the tape without applying any code perforations thereto. The contacts 112 and 104 thus become closed to continue the machine cycle and the sweep arm 124 moves on to the contact $y$ of the switch 122 and perforation of the tape T takes place to apply thereto an indication of the year. The sweep arm continues in the normal course of events to cause the day of the month and month of the year to be perforated on the tape T. Immediately after this last described operation, the sweep arm 124 engages in succession two of the contacts SP and the tape is thus indexed twice to separate the complete time indication from the next time indication to be rendered.

It is to be noted that the various contacts 104, 100 and 112 of the perforator 90 operate during each machine cycle to short the switch S' out of the circuit in which it is disposed. These contacts thus operate to momentarily close the circuit leading to the magnet 134 by means of which the magnets 132 and 130 are energized. When the sweep arm 124 again returns to the contacts labeled ST, the circuit which is under the control of the switch S' is opened and the apparatus ceases to function. The apparatus will then remain inactive until such time as the operator again depresses the switch S'.

It has been previously stated that the present apparatus is designed for use as an auxiliary piece of equipment and is adapted to be electrically connected to some other control apparatus, as for example, a telemetering system wherein a series of meters are read by telemetric circuits. Toward this end, the group of wires $b$ and the common wire $d$ leading to the perforator 90 are connected by a cable group 150 to a conventional five-prong plug 151 or the like. It will be seen that because of the fact that the switch S" normally remains open, the perforator 90 may be operated directly from whatever main instrumentality is connected to the plug 151. The circuit leading through the line $r$ being thus open, closing of one or more of the contacts 100 of the perforator will fail to cause energization of the electromagnet 134 and, as a consequence, the time perforating mechanism will remain inactive. When the main operating instrumentality has concluded one cycle of its operation and has otherwise ceased to function, the operator may depress the switch S', thus energizing the magnet 134 and setting the time perforating apparatus into operation in the manner previously described. As soon as the extension 125 on the sweep arm 124 engages the contact ring 123, the magnet 133 will become energized, thus closing the switch S" and establishing a connection between the perforator 90 and the magnet 134 for operative energization of the latter during subsequent perforating operations.

The invention is not to be limited to the exact arrangement of parts shown in the accompanying drawings or described in this specification as various changes in the details of construction may be resorted to without departing from the spirit of the invention. Only insofar as the invention has been particularly pointed out in the accompanying claims is the same to be limited.

What is claimed is:

1. In a time recording mechanism, a perforating apparatus for applying code perforations to a record media and including a plurality of perforating devices, an electromagnet for each perforating device operable upon energization thereof to actuate the latter, a pair of normally open contacts associated with each electromagnet and adapted upon energization of the latter to become closed, a group of main signaling circuits operatively connected to said electromagnets and adapted to be selectively closed to energize the latter, a plurality of branch circuit groups connected to the main signaling circuit in parallel, the circuits of each branch circuit group being adapted to be selectively closed to close selected circuits of the main circuit group, a plurality of rotatable time indicating elements, means for rotating the latter, means operable upon rotation of each element for selectively preparing the circuits of a respective branch circuit group for subsequent closing thereof, a normally open contact group disposed in each branch circuit group, an electromagnet for each contact group operable upon energization thereof to close the group in unison, a selector switch connected to said latter electromagnets for successively energizing the same, and means operable upon closing of any one of the pairs of contacts associated with the perforating device for indexing said selector switch.

2. In a time recording mechanism, a perforating apparatus for applying code perforations to a record media and including a plurality of perforating devices, an electromagnet for each perforating device operable upon energization thereof to actuate the latter, a pair of normally open contacts associated with each electromagnet and adapted upon energization of the latter to become closed, a group of main signaling circuits operatively connected to said electromagnet and adapted to be selectively closed to energize the latter, a plurality of branch circuit groups connected to the main signaling circuit in parallel, the circuits of each branch circuit being adapted to be selectively closed to close selected circuits of the main circuit group, a plurality of rotatable time indicating elements, means for rotating the latter, means operable upon rotation of each element for selectively preparing the circuits of a respective branch circuit group for subsequent closing thereof, a normally open contact group disposed in each branch circuit group, an electromagnet for each contact group operable upon energization thereof to close the group in unison, a selector switch connected to said latter electromagnets for successively energizing the same, an electromagnet adapted to receive a momentary energizing impulse and operable during deenergization thereof to operatively index the switch, and means operable upon closing of any one of the pairs of contacts associated with the perforating device for applying an impulse of current to said last mentioned electromagnet.

3. In a time recording mechanism, a perforating apparatus for applying code perforations to a record media and including a plurality of perforating device operable upon energization thereof to actuate the latter, a pair of normally open contacts associated with each electromagnet and adapted upon energization of the latter to become closed, a group of main signaling circuits operatively connected to said electromagnets and adapted to be selectively closed to energize the latter, a plurality of branch circuit groups connected to the main signaling circuit in parallel, the circuits of each branch circuit group being adapted to be selectively closed to close selected circuits of the main circuit group, a plurality of rotatable time indicating elements, means for rotating the latter, means operable upon rotation of each element for selectively preparing the circuits of a respective branch circuit group for subsequent closing thereof, a normally open contact group disposed in each branch circuit group, an electromagnet for each contact group operable upon energization thereof to close the group in unison, a selector switch connected to said latter electromagnets for successively energizing the same, an electromagnet adapted to receive a momentary energizing impulse and operable during deenergization thereof to operatively index the switch, a circuit for said latter electromagnet including a pair of normally closed contacts, an electromagnet operable upon energization thereof to open said latter pair of contacts, said latter electromagnet responding slowly to an energizing impulse, a circuit for said last mentioned electromagnet including a pair of normally open contacts, an additional electromagnet operable upon energization thereof to close said last mentioned pair of contacts and means operable upon closing of any one of the pairs of contacts associated with the perforating device for applying an energizing impulse to said last mentioned electromagnet.

4. In a time recording mechanism, a perforating apparatus for applying code perforations to a record media and including a plurality of perforating devices, an electromagnet for each perforating device operable upon energization thereof to actuate the latter, a pair of normally open contacts associated with each electromagnet and adapted upon energization of the latter to become closed, a group of main signaling circuits operatively connected to said electromagnets and adapted to be selectively closed to energize the latter, a plurality of branch circuit groups connected to the main signaling circuit in parallel, the circuits of each branch circuit group being adapted to be selectively closed to close selected circuits of the main circuit group, a plurality of rotatable time indicating elements, means for rotating the latter, means operable upon rotation of each element for selectively preparing the circuits of a respective branch circuit group for subsequent closing thereof, a normally open contact group disposed in each branch circuit group, an electromagnet for each contact group operable upon energization thereof to close the group in unison, a selector switch connected to said latter electromagnets for successively energizing the same, an indexing magnet for said selector switch adapted to be momentarily energized and operable upon deenergization thereof to index the selector switch, a circuit for said indexing magnet including a pair of normally closed contacts, a slow acting electromagnet operable when fully energized to open said contacts, a circuit for said slow acting magnet including a pair of normally open contacts, and a relay magnet operable upon energization thereof to close said latter normally open contacts and a circuit for said relay magnet, the normally open contacts associated with the perforating device being disposed in the circuit of said relay magnet and operable upon closing of any one of them to establish said last mentioned circuit.

5. In a time recording mechanism, a perforating apparatus for applying code perforations to a record media and including a plurality of perforating devices, an electromagnet for each perforating device operable upon energization thereof to actuate the latter, a pair of normally open contacts associated with each electromagnet and adapted upon energization of the latter to become closed, a group of main signaling circuits operatively connected to said electromagnets and adapted to be selectively closed to energize the latter, a plurality of branch circuit groups connected to the main signaling circuit in parallel, the circuits of each branch circuit group being adapted to be selectively closed to close selected circuits of the main circuit group, a plurality of rotatable time indicating elements, means for rotating the latter, means operable upon rotation of each element for selectively preparing the circuits of a respective branch circuit group for subsequent closing thereof, a normally open contact group disposed in each branch circuit group, an electromagnet for each contact group operable upon energization thereof to close the group in unison, a selector switch connected to said latter electromagnets for successively energizing the same, an indexing magnet for said selector switch adapted to be momentarily energized and operable upon deenergization thereof to index the selector switch, a circuit for said indexing magnet including a pair of normally closed contacts, a slow acting electromagnet operable when fully energized to open said contacts, a circuit for said slow acting magnet including a pair of normally open contacts, and a relay magnet operable upon energization thereof to close said latter normally open contacts and a circuit for said relay magnet, the normally open contacts associated with the perforating device being disposed in the circuit of said relay magnet and operable upon closing of any one of them to establish said last mentioned circuit, a switch disposed in the circuit of said relay magnet and a lead-in circuit group connected to said main circuit group for independently controlling the operation of said perforating device.

WARD LEATHERS.
HUGO PANISSIDI.

CERTIFICATE OF CORRECTION.

Patent No. 2,352,440. June 27, 1944.

WARD LEATHERS, ET AL.

It is hereby certified that error appears in the printed specification of the above numbered patent requiring correction as follows: Page 5, second column, line 51, claim 2, for the words "circuit being" read --circuit group being--; and that the said Letters Patent should be read with this correction therein that the same may conform to the record of the case in the Patent Office.

Signed and sealed this 12th day of September, A. D. 1944.

Leslie Frazer (Seal)                           Acting Commissioner of Patents.